(12) United States Patent
Li et al.

(10) Patent No.: US 10,701,757 B2
(45) Date of Patent: Jun. 30, 2020

(54) MULTICAST SERVICE RECEIVING METHOD, MULTICAST SERVICE SENDING METHOD, APPARATUS, AND SYSTEM

(71) Applicant: Huawei Technologies Co., Ltd., Shenzhen (CN)

(72) Inventors: Bingzhao Li, Beijing (CN); Yongqiang Gao, Beijing (CN); Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/181,071

(22) Filed: Nov. 5, 2018

(65) Prior Publication Data

US 2019/0075614 A1 Mar. 7, 2019

Related U.S. Application Data

(63) Continuation of application No. PCT/CN2016/081295, filed on May 6, 2016.

(51) Int. Cl.
*H04W 76/40* (2018.01)
*H04W 4/06* (2009.01)
(Continued)

(52) U.S. Cl.
CPC ............ *H04W 76/40* (2018.02); *H04W 4/06* (2013.01); *H04W 48/12* (2013.01);
(Continued)

(58) Field of Classification Search
CPC ....... H04W 76/40; H04W 4/06; H04W 76/15; H04W 48/12; H04W 72/1273; H04W 72/1289

See application file for complete search history.

(56) References Cited

U.S. PATENT DOCUMENTS

2009/0116418 A1   5/2009 Lee et al.
2011/0243056 A1* 10/2011 Jen ..................... H04L 5/0007
                                                              370/312
(Continued)

FOREIGN PATENT DOCUMENTS

CN      101257649 A    9/2008
CN      102083004 A    6/2011
(Continued)

OTHER PUBLICATIONS

Office Action issued in Chinese Application No. 201680085407.6 on Feb. 21, 2020, 18 pages (with English translation).

*Primary Examiner* — Hashim S Bhatti
(74) *Attorney, Agent, or Firm* — Fish & Richardson P.C.

(57) ABSTRACT

Embodiments of the present disclosure provide a multicast service transmission method, including: a terminal receives from a first cell, configuration information corresponding to an MBMS, where the configuration information corresponding to the MBMS includes: a cell identity of at least one second cell; the terminal obtains configuration information of the second cell based on the cell identity of the second cell; and receives from the second cell, an MTCH based on the configuration information of the second cell. This resolves a problem that the terminal can receive in one cell, an MCCH and the MTCH corresponding to the MBMS, and achieves an effect that the terminal device can receive, from the first cell and the at least one second cell, a same multicast service by using a carrier aggregation technology.

20 Claims, 7 Drawing Sheets

(51) Int. Cl.
*H04W 76/15* (2018.01)
*H04W 48/12* (2009.01)
*H04W 72/12* (2009.01)

(52) U.S. Cl.
CPC ... *H04W 72/1273* (2013.01); *H04W 72/1289* (2013.01); *H04W 76/15* (2018.02)

(56) References Cited

U.S. PATENT DOCUMENTS

| | | | |
|---|---|---|---|
| 2013/0130616 A1* | 5/2013 | Lee | H04W 4/06 455/3.01 |
| 2014/0119263 A1 | 5/2014 | Shaun et al. | |
| 2014/0269566 A1 | 9/2014 | Wang et al. | |
| 2015/0055541 A1 | 2/2015 | Zhang et al. | |
| 2016/0249324 A1* | 8/2016 | Takano | H04W 72/005 |
| 2017/0310718 A1* | 10/2017 | Kim | H04W 4/06 |

FOREIGN PATENT DOCUMENTS

| | | |
|---|---|---|
| CN | 102595331 A | 7/2012 |
| CN | 102611994 A | 7/2012 |
| CN | 102857865 A | 1/2013 |
| CN | 104756566 A | 7/2015 |
| CN | 105493592 A | 4/2016 |
| WO | 2015093141 A1 | 6/2015 |

\* cited by examiner

MULTICAST SERVICE RECEIVING METHOD, MULTICAST SERVICE SENDING METHOD, APPARATUS, AND SYSTEM

CROSS-REFERENCE TO RELATED APPLICATIONS

This application is a continuation of International Application No. PCT/CN2016/081295 filed on May 6, 2016, the disclosure of which is hereby incorporated by reference in its entirety.

TECHNICAL FIELD

Embodiments of the present disclosure relate to the communications field, and in particular, to a multicast service receiving method, a multicast service sending method, an apparatus, and a system.

BACKGROUND

When a base station communicates with a terminal device, there is a multicast transmission mechanism of single-cell point-to-multipoint (SC-PTM). In this transmission mechanism, one base station simultaneously sends a same multimedia broadcast multicast service (MBMS) to a plurality of terminal devices.

In the SC-PTM mechanism, when sending the MBMS to the terminal devices by using the SC-PTM mechanism, the base station sends service control information to the terminal devices on a carrier by using an MBMS point-to-multipoint control channel (MCCH). The service control information usually includes: a service identity of the MBMS and a group-radio network temporary identifier (G-RNTI) corresponding to the MBMS. The G-RNTI is used to indicate a terminal device that needs to receive the MBMS. The terminal device receives the MBMS on the same carrier based on the received G-RNTI by using an MBMS traffic channel (MTCH).

When a terminal device is covered by a plurality of cells, one cell corresponds to one carrier frequency, and different cells correspond to different carrier frequencies. The terminal device can receive an MCCH and an MTCH only on a carrier frequency corresponding to one cell.

SUMMARY

To resolve a problem that a terminal device can receive, only on a carrier frequency corresponding to one cell, an MCCH and an MTCH corresponding to an MBMS, embodiments of the present disclosure provide a multicast service receiving method, a multicast service sending method, an apparatus, and a system. The technical solutions are as follows:

According to a first aspect, a multicast service receiving method is provided. The method includes: receiving, by a terminal device from a first cell, configuration information corresponding to a multimedia broadcast service MBMS, where the configuration information corresponding to the MBMS includes: a cell identity of at least one second cell, and the second cell is used to transmit the MBMS (MBMS) in coordination with the first cell at a same scheduling moment or different scheduling moments; obtaining, by the terminal device, configuration information of the second cell based on the cell identity of the second cell; and receiving, by the terminal device from the second cell, an MBMS traffic channel (MTCH) based on the configuration information of the second cell.

In the multicast service sending and receiving method, a network device sends, in the first cell, the configuration information corresponding to the MBMS to the terminal device. The configuration information corresponding to the MBMS includes: a cell identity of at least one second cell. The terminal device obtains the configuration information of the second cell based on the cell identity of the second cell. The second cell is used to transmit the MBMS in coordination with the first cell at a same scheduling moment or different scheduling moments. The terminal device receives, from the second cell, the MTCH based on the configuration information of the second cell. This resolves a problem that the terminal device can receive, only in one cell, an MCCH and the MTCH corresponding to the MBMS, and achieves an effect that the terminal device can receive, from the first cell and the at least one second cell, a same multicast service by using a carrier aggregation technology.

With reference to the first aspect, in a first possible implementation of the first aspect, before the obtaining, by the terminal device, configuration information of the second cell based on the cell identity of the second cell, the method further includes: receiving, by the terminal device from the first cell, configuration information of n cells, where the n cells are cells supporting coordinated transmission of the MBMS, the second cell is a subset of the n cells, and the configuration information includes at least a correspondence among a cell identity, frequency information, and bandwidth information; and the obtaining, by the terminal device, configuration information of the second cell based on the cell identity of the second cell includes: obtaining, by the terminal device, the configuration information of the second cell from the configuration information of the n cells based on the cell identity of the second cell.

With reference to the first aspect or the first possible implementation of the first aspect, in a second possible implementation of the first aspect, the configuration information corresponding to the MBMS further includes: a first group-radio network temporary identifier (G-RNTI); the method further includes: receiving, by the terminal device from the first cell, scheduling information by using the first G-RNTI, and receiving, from the first cell, the MTCH based on the scheduling information; and the receiving, by the terminal device from the second cell, an MTCH based on the configuration information of the second cell includes: receiving, by the terminal device from the second cell, the scheduling information based on the configuration information of the second cell by using the first G-RNTI, and receiving, from the second cell, the MTCH based on the scheduling information; or receiving, by the terminal device from the first cell, the scheduling information based on the configuration information of the second cell by using the first G-RNTI, and receiving, from the second cell, the MTCH based on the scheduling information, where the scheduling information is used to indicate a time-frequency resource location occupied by the MTCH.

In the optional implementation, the network device only needs to indicate the first G-RNTI to the terminal device. The terminal device may receive, from the first cell and the at least one second cell, the MTCH by using the first G-RNTI. The network device no longer needs to indicate, to the terminal device by using signaling, a G-RNTI used in each second cell, thereby reducing air interface signaling.

With reference to the first aspect or the first possible implementation of the first aspect, in a third possible implementation of the first aspect, the configuration information corresponding to the MBMS further includes: a first G-RNTI, and the configuration information corresponding to the MBMS or the configuration information of the second cell further includes: a second G-RNTI; the method further includes: receiving, by the terminal device from the first cell, scheduling information by using the first G-RNTI, and receiving, from the first cell, the MTCH based on the scheduling information; and the receiving, by the terminal device from the second cell, an MTCH based on the configuration information of the second cell includes: receiving, by the terminal device from the second cell, the scheduling information based on the configuration information of the second cell by using the second G-RNTI, and receiving, from the second cell, the MTCH based on the scheduling information, where the scheduling information is used to indicate a time-frequency resource location occupied by the MTCH.

With reference to the third possible implementation of the first aspect, in a fourth possible implementation of the first aspect, the first cell uses a licensed carrier, and the second cell uses a licensed carrier or an unlicensed carrier.

In the optional implementation, the second cell used to transmit the MBMS in coordination with the first cell at a same scheduling moment or different scheduling moments by using a carrier aggregation technology may use the unlicensed carrier, so that the terminal device may receive, from the second cell using an unlicensed spectrum, the multicast service, thereby improving resource usage of the unlicensed spectrum.

With reference to the second possible implementation of the first aspect, in a fifth possible implementation of the first aspect, the receiving, by the terminal device from the first cell, the scheduling information based on the configuration information of the second cell by using the first G-RNTI, and receiving, from the second cell, the MTCH based on the scheduling information includes: receiving, by the terminal device from the first cell, downlink control information (DCI) by using the first G-RNTI; parsing, by the terminal device, a predetermined field in the DCI to obtain the cell identity of the second cell; determining, by the terminal device, the configuration information of the scheduled second cell based on the cell identity of the second cell; and receiving, by the terminal device from the second cell, the MTCH based on the configuration information of the second cell.

With reference to the fifth possible implementation of the first aspect, in a sixth possible implementation of the first aspect, the predetermined field is at least one of a hybrid automatic repeat request (HARQ) process number, a new data indicator (NDI), a redundancy version (RV), a transmission power control (TPC) command for a physical uplink control channel (PUCCH) (TPC command for PUCCH), and a flag for format 0/format 1A differentiation.

With reference to any one of the first aspect, the first possible implementation of the first aspect, the second possible implementation of the first aspect, the third possible implementation of the first aspect, and the fourth possible implementation of the first aspect, in a seventh possible implementation of the first aspect, the method further includes: in a subframe that is N subframes after a subframe in which the configuration information corresponding to the MBMS is received, performing, by the terminal device, the step of receiving, from the second cell, an MTCH based on the configuration information of the second cell, where N is a value greater than or equal to 0.

With reference to any one of the first aspect, the first possible implementation of the first aspect, the second possible implementation of the first aspect, the third possible implementation of the first aspect, the fourth possible implementation of the first aspect, and the fifth possible implementation of the first aspect, in an eighth possible implementation of the first aspect, the configuration information of the second cell includes: the cell identity of the second cell; in the configuration information of the n cells, the cell identity of the second cell is a physical cell identity of the second cell or a physical cell identity of the second cell and a cell number of the second cell; in the configuration information corresponding to the MBMS, the cell identity of the second cell is the cell number of the second cell and a cell index of the second cell, where the cell number of the second cell is a sequence number of the second cell in the configuration information of the n cells, and the cell index of the second cell is a sequence number of the second cell in the configuration information corresponding to the MBMS.

With reference to any one of the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, and the eighth possible implementation of the first aspect, in a ninth possible implementation of the first aspect, the configuration information of the second cell further includes: a signal threshold and reference signal configuration information of the second cell, and the reference signal configuration information is discovery reference signal (DRS) and/or common reference signal (CRS) configuration information; and the method further includes: obtaining, by the terminal device, a signal measurement result of the second cell based on the reference signal configuration information of the second cell; and when the signal measurement result of the second cell is less than or equal to the signal threshold, feeding back, by the terminal device, first indication information to a network device, where the first indication information is used to indicate to the network device that the signal measurement result of the second cell is less than or equal to the signal threshold.

In the optional implementation, the terminal device measures a signal of the second cell to obtain the signal measurement result, and when the signal measurement result is less than or equal to the signal threshold, feeds back the first indication information to the network device. This achieves an effect that when the signal of the second cell used to transmit the MTCH is very poor, a feedback may be provided to the network device in time to avoid a transmission error caused because the signal of the second cell is excessively poor.

With reference to any one of the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, and the eighth possible implementation of the first aspect, in a tenth possible implementation of the first aspect, the configuration information of the second cell further includes: a signal threshold and reference signal configuration information of the second cell, and the reference signal configuration information is DRS and/or CRS configuration information; and the method further includes: obtaining, by the terminal device, a signal measurement result of the second cell based on the reference signal configuration information of the second cell; obtaining, by the terminal device, a signal measurement result of the first cell; and when the signal measurement result of the second cell is less than or equal to the signal threshold, and the signal measurement result of the first cell is greater than the signal threshold, feeding back, by the terminal device, second indication information to a network device, where the second indication information is used to indicate to the network device that the signal measurement result of the first cell is greater than the signal threshold, and the signal measurement result of the second cell is less than or equal to the signal threshold.

In the optional implementation, the terminal device measures signals of the first cell and the second cell to obtain the signal measurement results. When the signal of the first cell is also relatively poor, although a feedback is provided to the network device, the multicast service still cannot be transmitted by using a cell with a better signal. Therefore, when the signal of the second cell is relatively poor, the signal of the first cell is also detected. Only when the signal of the first cell is relatively desirable and the signal of the second cell is relatively poor, a feedback is provided to the network device. This avoids waste of air interface signaling caused by meaningless information feedback.

According to a second aspect, a multicast service sending method is provided. The method includes: sending, by a network device in a first cell, configuration information corresponding to an MBMS, where the configuration information corresponding to the MBMS includes: a cell identity of at least one second cell, and the second cell is used to transmit the MBMS in coordination with the first cell at a same scheduling moment or different scheduling moments; and sending, by the network device in the second cell, an MTCH based on configuration information of the second cell.

In the multicast service sending and receiving method, the network device sends, in the first cell, the configuration information corresponding to the MBMS to a terminal device. The configuration information corresponding to the MBMS includes: a cell identity of at least one second cell. The terminal device obtains the configuration information of the second cell based on the cell identity of the second cell. The second cell is used to transmit the MBMS in coordination with the first cell at a same scheduling moment or different scheduling moments. The terminal device receives, from the second cell, the MTCH based on the configuration information of the second cell. This resolves a problem that the terminal device can receive, only in one cell, an MCCH and the MTCH corresponding to the MBMS, and achieves an effect that the terminal device can receive, from the first cell and the second cell, a same multicast service by using a carrier aggregation technology.

With reference to the second aspect, in a first possible implementation of the second aspect, before the sending, by the network device in the second cell, an MBMS traffic channel MTCH, the method further includes: sending, in the first cell, by the network device, configuration information of n cells, where the n cells are cells supporting coordinated transmission of the MBMS, the second cell is a subset of the n cells, and the configuration information includes at least a correspondence among a cell identity, frequency information, and bandwidth information.

With reference to the second aspect or the first possible implementation of the second aspect, in a second possible implementation of the second aspect, the configuration information corresponding to the MBMS further includes: a first G-RNTI; the method further includes: sending, in the first cell, by the network device, scheduling information by using the first G-RNTI, and sending, in the first cell, the MTCH based on the scheduling information; and the sending, by the network device in the second cell, an MTCH based on configuration information of the second cell includes: sending, by the network device in the second cell, the scheduling information based on the configuration information of the second cell by using the first G-RNTI, and sending, in the second cell, the MTCH based on the scheduling information; or sending, in the first cell, by the network device, the scheduling information based on the configuration information of the second cell by using the first G-RNTI, and sending, in the second cell, the MTCH based on the scheduling information, where the scheduling information is used to indicate a time-frequency resource location occupied by the MTCH.

With reference to the second aspect or the first possible implementation of the second aspect, in a third possible implementation of the second aspect, the configuration information corresponding to the MBMS further includes: a first G-RNTI, and the configuration information corresponding to the MBMS or the configuration information of the second cell further includes: a second G-RNTI; the method further includes: sending, in the first cell, by the network device, scheduling information by using the first G-RNTI, and sending, in the first cell, the MTCH based on the scheduling information; and the sending, by the network device in the second cell, an MTCH based on configuration information of the second cell includes: sending, by the network device in the second cell, the scheduling information based on the configuration information of the second cell by using the second G-RNTI, and sending, in the second cell, the MTCH based on the scheduling information, where the scheduling information is used to indicate a time-frequency resource location occupied by the MTCH.

With reference to the third possible implementation of the second aspect, in a fourth possible implementation of the second aspect, the first cell uses a licensed carrier, and the second cell uses a licensed carrier or an unlicensed carrier.

In the optional implementation, the second cell used to transmit the MBMS in coordination with the first cell at a same scheduling moment or different scheduling moments by using a carrier aggregation technology may use the unlicensed carrier, so that the terminal device may receive, from the second cell using an unlicensed spectrum, the multicast service, thereby improving resource usage of the unlicensed spectrum.

With reference to the second possible implementation of the second aspect, in a fifth possible implementation of the second aspect, the sending, in the first cell, by the network device, the scheduling information based on the configuration information of the second cell by using the first G-RNTI, and sending, in the second cell, the MTCH based on the scheduling information includes: sending, in the first cell, by the network device, DCI by using the first G-RNTI, where a predetermined field in the DCI carries the cell identity of the scheduled second cell; and sending, by the network device in the second cell, the MTCH based on the configuration information of the second cell.

With reference to the fifth possible implementation of the second aspect, in a sixth possible implementation of the second aspect, the predetermined field is at least one of a HARQ process number, an NDI, an RV, a TPC command for PUCCH, and a flag for format 0/format 1A differentiation.

With reference to any one of the second aspect, the first possible implementation of the second aspect, the second possible implementation of the second aspect, the third possible implementation of the second aspect, and the fourth possible implementation of the second aspect, in a seventh possible implementation of the second aspect, the method further includes: in a subframe that is N subframes after a subframe in which the configuration information corresponding to the MBMS is sent, performing, by the network device, the step of sending, in the second cell, an MTCH based on configuration information of the second cell, where N is a value greater than or equal to 0.

With reference to any one of the second aspect, the first possible implementation of the second aspect, the second possible implementation of the second aspect, the third possible implementation of the second aspect, the fourth possible implementation of the second aspect, and the fifth possible implementation of the second aspect, in an eighth possible implementation of the second aspect, the configuration information of the second cell includes: the cell identity of the second cell; in the configuration information of the n cells, the cell identity of the second cell is a physical cell identity of the second cell or a physical cell identity of the second cell and a cell number of the second cell; and in the configuration information corresponding to the MBMS, the cell identity of the second cell is the cell number of the second cell and a cell index of the second cell, where the cell number of the second cell is a sequence number of the second cell in the configuration information of the n cells, and the cell index of the second cell is a sequence number of the second cell in the configuration information corresponding to the MBMS.

With reference to any one of the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, and the eighth possible implementation of the second aspect, in a ninth possible implementation of the second aspect, the configuration information of the second cell further includes: a signal threshold and reference signal configuration information of the second cell, and the reference signal configuration information is DRS and/or CRS configuration information; and the method further includes: receiving, by the network device, first indication information fed back by the terminal device, where the first indication information is information that is sent when a signal measurement result of the second cell that is obtained by the terminal device based on the reference signal configuration information of the second cell is less than or equal to the signal threshold, and the first indication information is used to indicate that the signal measurement result of the second cell is less than or equal to the signal threshold.

In the optional implementation, the terminal device measures a signal of the second cell to obtain the signal measurement result, and when the signal measurement result is less than or equal to the signal threshold, feeds back the first indication information to the network device. This achieves an effect that when the signal of the second cell used to transmit the MTCH is very poor, a feedback may be provided to the network device in time to avoid a transmission error caused because the signal of the second cell is excessively poor.

With reference to any one of the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, and the eighth possible implementation of the second aspect, in a tenth possible implementation of the second aspect, the configuration information of the second cell further includes: a signal threshold and reference signal configuration information of the second cell, and the reference signal configuration information is DRS and/or CRS configuration information; and the method further includes: receiving, by the network device, second indication information fed back by the terminal device, where the second indication information is information that is sent when a signal measurement result of the second cell that is obtained by the terminal device based on the reference signal configuration information of the second cell is less than or equal to the signal threshold, and a signal measurement result of the first cell that is obtained by the terminal device is greater than the signal threshold, and the second indication information is used to indicate that the signal measurement result of the first cell is greater than the signal threshold, and the signal measurement result of the second cell is less than or equal to the signal threshold.

In the optional implementation, the terminal device measures signals of the first cell and the second cell to obtain the signal measurement results. When the signal of the first cell is also relatively poor, although a feedback is provided to the network device, the multicast service still cannot be transmitted by using a cell with a better signal. Therefore, when the signal of the second cell is relatively poor, the signal of the first cell is detected. Only when the signal of the first cell is relatively desirable and the signal of the second cell is relatively poor, a feedback is provided to the network device. This avoids waste of air interface signaling caused by meaningless information feedback.

According to a third aspect, a multicast service receiving apparatus is provided. The multicast service receiving apparatus includes at least one unit, and the at least one unit is configured to perform the multicast service receiving method provided in the first aspect.

According to a fourth aspect, a multicast service sending apparatus is provided. The multicast service sending apparatus includes at least one unit, and the at least one unit is configured to perform the multicast service sending method provided in the second aspect.

According to a fifth aspect, a terminal device is provided. The terminal device includes: a processor, and a memory, a transmitter, and a receiver that are connected to the processor, the memory is configured to store one or more instructions, the instructions are configured to be executed by the processor, and the processor executes the instructions in the memory to perform the multicast service receiving method provided in the first aspect.

According to a sixth aspect, a network device is provided. The network device includes: a processor, and a memory, a transmitter, and a receiver that are connected to the processor, the memory is configured to store one or more instructions, the instructions are configured to be executed by the processor, and the processor executes the instructions in the memory to perform the multicast service sending method provided in the second aspect.

According to a seventh aspect, a multicast service sending and receiving system is provided. The multicast service sending and receiving system includes the multicast service receiving apparatus provided in the third aspect and the multicast service sending apparatus provided in the fourth aspect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The technical solutions in embodiments of the present disclosure are clearly and described in the following with reference to the accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1A:
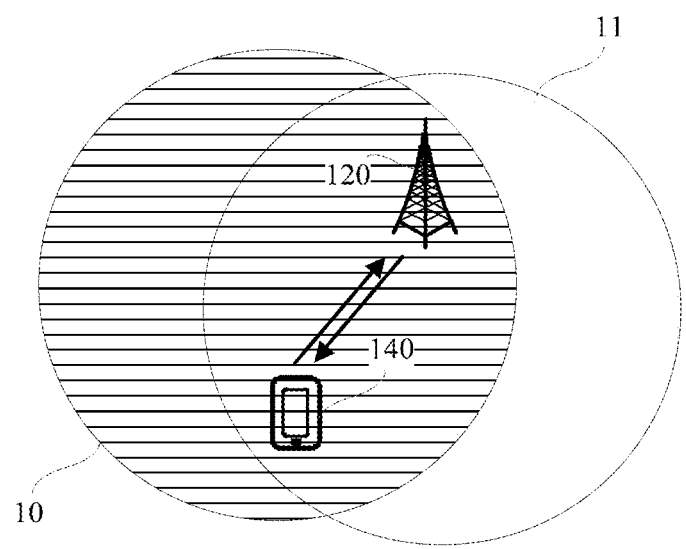
FIG. 1A is a schematic structural diagram of a multicast service sending and receiving system according to an example embodiment of the present disclosure.

Referring to FIG. 1A, FIG. 1A is a schematic structural diagram of a multicast service sending and receiving system according to an example embodiment of the present disclosure. The multicast service sending and receiving system includes: a network device 120 and a terminal device 140.

The network device 120 is a network element that transmits a service to the terminal device 140 in the system.

Optionally, the service transmitted by the network device 120 to the terminal device 140 is an MBMS, and the network device 120 simultaneously sends one MBMS to a plurality of terminal devices. FIG. 1A shows only an example of one terminal device 140. In a specific embodiment, there are usually a plurality of terminal devices 120.

Optionally, the network device 120 is at least one evolved NodeB (eNB or e-NodeB) in a Long Term Evolution-Advanced (LTE-A) system.

Optionally, the terminal device 140 is an electronic device having a wireless network communication capability such as a mobile phone, a tablet computer, an ebook reader, or a portable laptop computer.

Optionally, the terminal device 140 is simultaneously covered by a plurality of cells provided by the network device 120. FIG. 1A shows only an example in which the terminal device 140 is covered by a cell 10 and a cell 11. In a specific embodiment, a quantity of cells in which the terminal device 140 is located is not limited, and may be two or more. This is not limited in this embodiment.

Optionally, the network device 120 transmits a service to the terminal device 140 by using a carrier aggregation technology.

When the network device transmits an MBMS to the terminal device, the network device sends an MCCH to the terminal device. Sending the MCCH refers to sending service control information of the MBMS carried on the MCCH. The service control information includes a temporary multicast group identifier (TMGI) of the MBMS and a G-RNTI corresponding to the MBMS. The G-RNTI is used to indicate at least one terminal device that needs to receive the MBMS, and the at least one terminal device that needs to receive the MBMS shares the same G-RNTI.

Figure 1B:
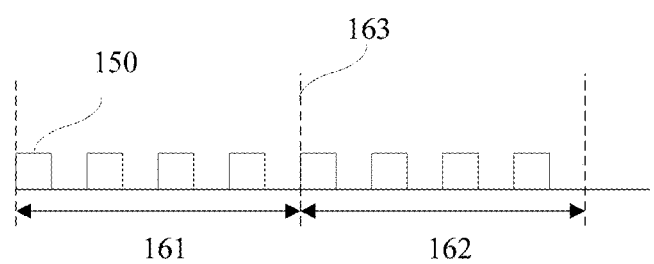
FIG. 1B is a schematic diagram of sending and receiving a multicast service according to an example embodiment of the present disclosure.

As shown in FIG. 1B, a network device sends an MCCH to a terminal device once in each repetition period (RP) 150. One modification period (MP) 161 includes a plurality of repetition periods 150. In a modification period, content of the MCCH does not change. When the network device needs to change the content of the MCCH, the network device sends a new MCCH in a next modification period starting from the border of two modification periods. As shown in FIG. 1B, a new MCCH is sent in a modification period 162 starting from the border 163 between a modification period 161 and the modification period 162. Content of the MCCHs transmitted in the modification period 161 and the modification period 162 may be different.

The terminal device reads an MCCH only once in one modification period. After having accessed a cell, the terminal device usually reads the first MCCH in a modification period. When accessing the cell in the middle of a modification period, the terminal device receives a latest MCCH in the modification period after accessing the cell.

After reading the MCCH, the terminal device receives an MBMS traffic channel (MBMS Traffic Channel, MTCH) based on service control information of an MBMS carried on the MCCH. Receiving the MTCH refers to receiving MBMS data carried on the MTCH channel.

A carrier aggregation (CA) technology refers to that two or more component carriers (CC) are aggregated to transmit a service, to support a higher bandwidth. A bandwidth of each component carrier may reach 20 MHZ. When a network device transmits a service to the terminal device by using the carrier aggregation technology, the terminal device determines a quantity M of component carriers that can be supported by the terminal device, and the network device schedules the terminal device to transmit a service on M component carriers. Quantities M of component carriers used by different terminal devices may be different, and quantities M of component carriers used when different services are transmitted to a same terminal device may also be different.

When a network device transmits a service to a terminal device on two or more component carriers by using the carrier aggregation technology, the two or more component carriers include one primary component carrier (PCC) and at least one secondary component carrier (SCC). The primary component carrier is a licensed carrier, and the secondary component carrier is a licensed carrier or an unlicensed carrier. The licensed carrier is a carrier that a governmental organization (for example, State Radio Regulatory Commission) authorizes an operator to use. The unlicensed carrier is a carrier that can be directly used without authorization when related stipulations of a governmental organization (for example, State Radio Regulatory Commission) are observed.

One network device may cover a plurality of cells, and one terminal device may be located in coverage of a plurality of cells. Different cells correspond to different carrier frequencies when a same service is transmitted, and a same cell may correspond to different carrier frequencies when different services are transmitted. A terminal device performs service transmission with a network device by using a carrier frequency corresponding to a cell in which the terminal device is located. In the carrier aggregation technology, a cell corresponding to a primary component carrier is a primary cell (Pcell), and a cell corresponding to a secondary component carrier is a secondary cell (Scell).

In the multicast service sending and receiving system shown in FIG. 1A, only an example in which two component carriers are included is used for description, and the two component carriers include a primary carrier and a secondary carrier. A cell 10 corresponding to the primary carrier is a primary cell, and a cell 11 corresponding to the secondary carrier is a secondary cell. The terminal device 140 receives, from the primary cell 10 by using the primary carrier, an MBMS sent by the network device 120, and receives, from the secondary cell 11 by using the secondary carrier, an MBMS sent by the network device 120.

Figure 2:
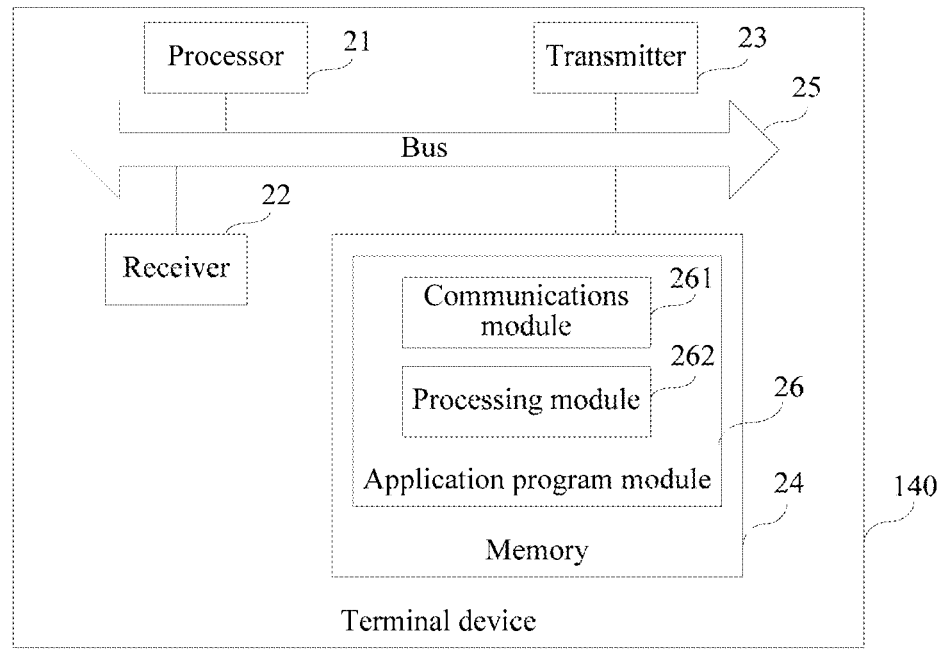
FIG. 2 is a schematic structural diagram of a terminal device according to an example embodiment of the present disclosure.

Referring to FIG. 2, FIG. 2 is a schematic structural diagram of a terminal device 140 according to an example embodiment of the present disclosure. The terminal device 140 includes: a processor 21, a receiver 22, a transmitter 23, a memory 24, and a bus 25.

The processor 21 includes one or more processing cores. The processor 21 executes various functional applications and data processing by running a software program and module.

The receiver 22 and the transmitter 23 may be implemented as a communications component. The communications component may be a communications chip. The communications chip may include a receiving module, a transmission module, a modulation and demodulation module, and the like, and is configured to receive or send a service by using a radio signal.

The memory 24 is connected to the processor 21 by using the bus 25.

The memory 24 may be configured to store a software program and module.

The memory 24 may store an application program module 26 required by at least one function. The application program module 26 may include: a communications module 261 and a processing module 262.

The communications module 261 is configured to: receive, from a first cell, configuration information corresponding to an MBMS, where the configuration information corresponding to the MBMS includes: a cell identity of at least one second cell, and the second cell is used to transmit the MBMS in coordination with the first cell at a same scheduling moment or different scheduling moments; and receive, from the second cell, an MTCH based on configuration information of the second cell.

The processing module 262 is configured to obtain the configuration information of the second cell based on the cell identity of the second cell.

In addition, the memory may be implemented by any type of volatile or non-volatile storage device or a combination thereof, for example, a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or a compact disc.

Figure 3:
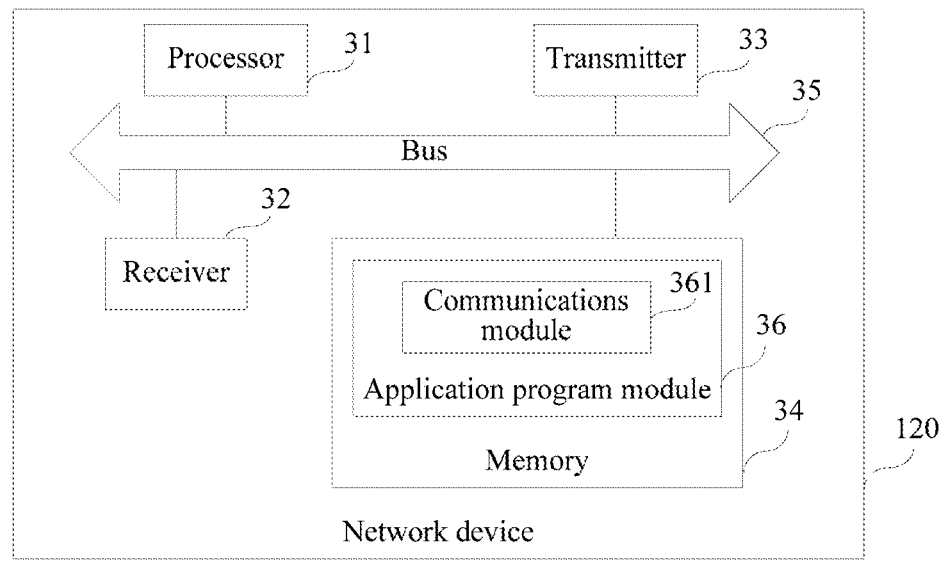
FIG. 3 is a schematic structural diagram of a network device according to an example embodiment of the present disclosure.

Referring to FIG. 3, FIG. 3 is a schematic structural diagram of a network device 120 according to an example embodiment of the present disclosure. The network device 120 includes: a processor 31, a receiver 32, a transmitter 33, a memory 34, and a bus 35.

The processor 31 includes one or more processing cores. The processor 31 executes various functional applications and data processing by running a software program and module.

The receiver 32 and the transmitter 33 may be implemented as a communications component. The communications component may be a communications chip. The communications chip may include a receiving module, a transmission module, a modulation and demodulation module, and the like, and is configured to receive or send a service by using a radio signal.

The memory 34 is connected to the processor 31 by using the bus 35.

The memory 34 may be configured to store a software program and module.

The memory 34 may store an application program module 36 required by at least one function. The application program module 36 may include: a communications module 361.

The communications module 361 is configured to: send, in a first cell, configuration information corresponding to an MBMS, where the configuration information corresponding to the MBMS includes: a cell identity of at least one second cell, and the second cell is used to transmit the MBMS in coordination with the first cell at a same scheduling moment or different scheduling moments; and send, in the second cell, an MTCH based on configuration information of the second cell.

In addition, the memory may be implemented by any type of volatile or non-volatile storage device or a combination thereof, for example, a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or a compact disc.

Figure 4:
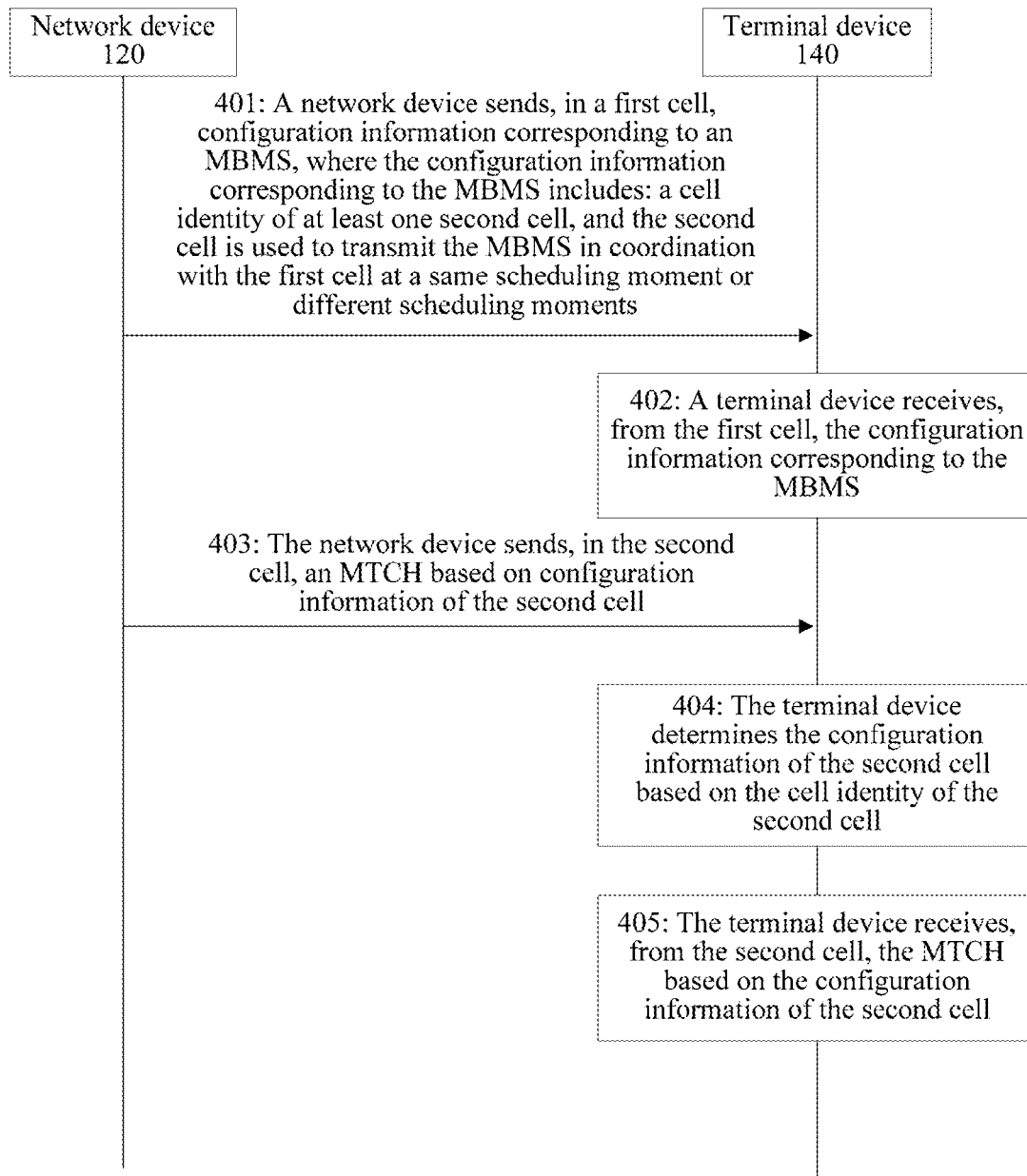
FIG. 4 is a flowchart of a multicast service sending and receiving method according to an example embodiment of the present disclosure.

Referring to FIG. 4, FIG. 4 is a flowchart of a multicast service sending and receiving method according to an example embodiment of the present disclosure. In descriptions of this embodiment, the method is applied to the multicast service sending and receiving system shown in FIG. 1A. The method includes:

Step 401: A network device sends, in a first cell, configuration information corresponding to an MBMS, where the configuration information corresponding to the MBMS includes: a cell identity of at least one second cell, and the second cell is used to transmit the MBMS in coordination with the first cell at a same scheduling moment or different scheduling moments.

It should be noted that the configuration information corresponding to the MBMS may be further referred to as multicast service configuration information.

Step 402: A terminal device receives, from the first cell, the configuration information corresponding to the MBMS.

Step 403: The network device sends, in the second cell, an MTCH based on configuration information of the second cell.

Step 404: The terminal device obtains the configuration information of the second cell based on the cell identity of the second cell.

Step 405: The terminal device receives, from the second cell, the MTCH based on the configuration information of the second cell.

It should be noted that step 401 and step 403 may be separately implemented as a multicast service sending method on a network device side, and step 402, step 404, and step 405 may be separately implemented as a multicast service receiving method on a terminal device side.

In conclusion, in the multicast service sending and receiving method provided in this embodiment of the disclosure, the network device sends, in the first cell, configuration information of n cells and the configuration information corresponding to the MBMS to the terminal device. The configuration information of the n cells includes: configuration information of at least one second cell. The configuration information of the second cell includes a cell identity of the at least one second cell used to transmit the MBMS jointly with the first cell by using a carrier aggregation technology. The terminal device determines the configuration information of the second cell based on the configuration information of the n cells and the cell identity of the second cell, and receives, from the second cell, the MTCH based on the configuration information of the second cell. This resolves a problem that the terminal device can receive, only in one cell, an MCCH and the MTCH corresponding to the MBMS, and achieves an effect that the terminal device can receive, from the first cell and the at least one second cell, a same multicast service by using a carrier aggregation technology.

When the terminal device receives, from the second cell, the MTCH, based on whether the second cell uses a licensed carrier or an unlicensed carrier, there are two different receiving manners. In this embodiment, an example in which the second cell uses the licensed carrier is used to describe a first manner in which the terminal device receives, from the second cell, the MTCH.

Figure 5A:
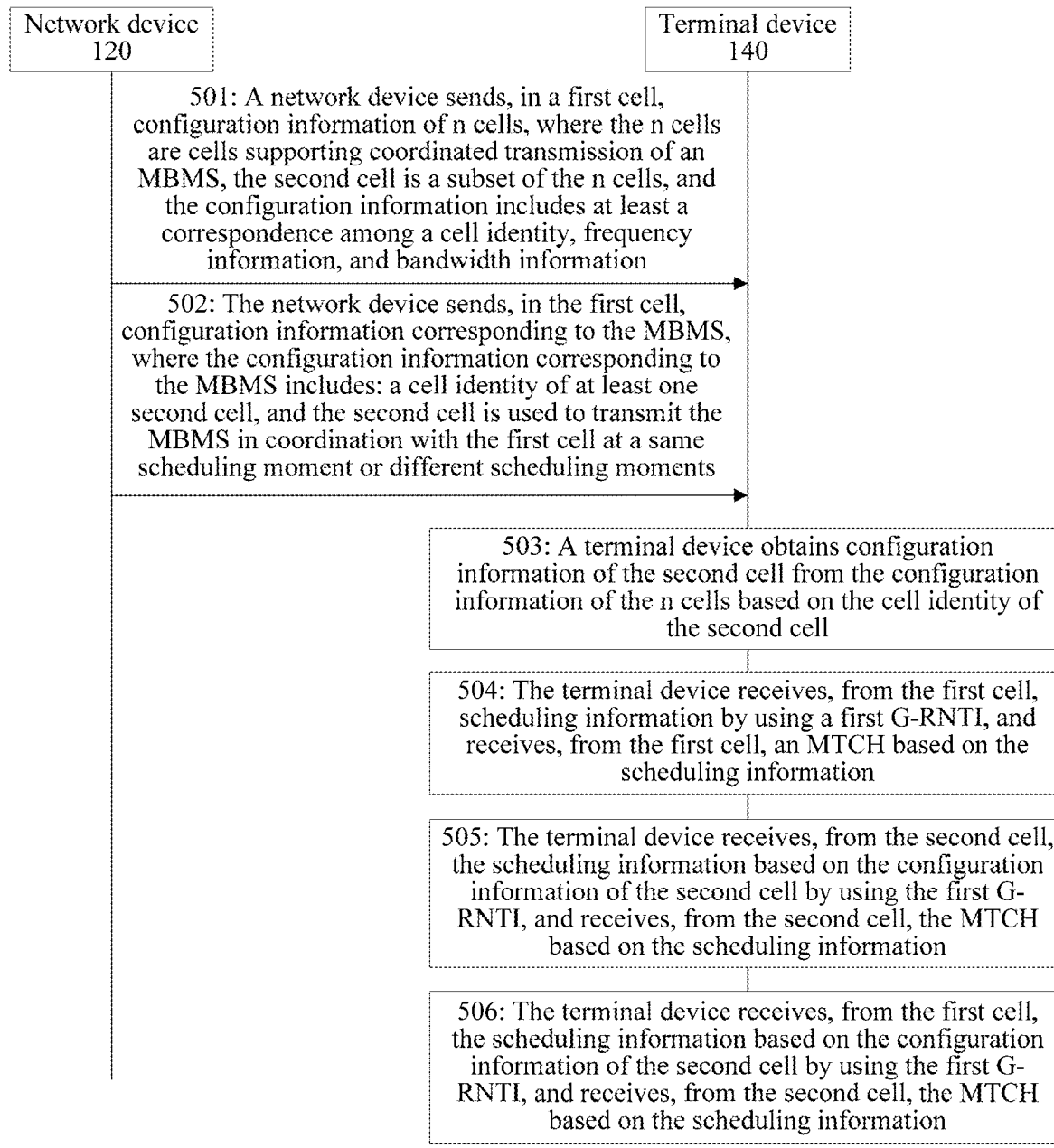
FIG. 5A is a flowchart of a multicast service sending and receiving method according to another example embodiment of the present disclosure.

Referring to FIG. 5A, FIG. 5A is a flowchart of a multicast service sending and receiving method according to an example embodiment of the present disclosure. In descriptions of this embodiment, the method is applied to the multicast service sending and receiving system shown in FIG. 1A. The method includes the following steps.

Step 501: A network device sends, in a first cell, configuration information of n cells, where the n cells are cells supporting coordinated transmission of an MBMS, and the configuration information includes at least a correspondence among a cell identity, frequency information, and bandwidth information.

Optionally, the network device sends the configuration information of the n cells to a terminal device by using system broadcast information or an MCCH.

Optionally, the first cell is a primary cell, and the first cell uses a licensed carrier.

Optionally, the configuration information includes at least one of a cell identity, frequency information, bandwidth information, reference signal configuration information, and a signal threshold. The frequency information, the bandwidth information, the reference signal configuration information, and the signal threshold are optional.

Optionally, content included in configuration information of different cells of the n cells may be the same or different.

Optionally, in the configuration information of the n cells, the cell identity is a physical cell identity or a physical cell identity and a cell number, and the physical cell identity corresponds to the cell number.

Optionally, the physical cell identity may be a physical cell identifier (PCI), an Evolved Universal Mobile Telecommunications System (UMTS) terrestrial access network (E-UTRAN) cell global identifier (ECGI), or other information used to identify a cell. This is not limited in this embodiment.

Optionally, a cell number of a cell is a sequence number of the cell in the configuration information of the n cells. The cell number may be explicitly configured. To be specific, the network device indicates the cell number of the cell to the terminal device by using signaling. Alternatively, the cell number may not be explicitly configured. To be specific, the network device does not use signaling for indication, and the cell number of the cell corresponds to a sequence of the cell in the configuration information of the n cells. A type of the cell identity is not limited in this embodiment.

Optionally, identity types used for cell identities of different cells in the n cells may be the same or different.

As shown in the following Table 1, Table 1 shows an example of a possible form of the configuration information of the n cells.

TABLE 1

|  | Physical cell identity | Frequency information/MHZ | Bandwidth information/MHZ | Cell number |
|---|---|---|---|---|
| Cell 1 | Physical cell identity 1 | 800 | 5 | 1 (00) |
| Cell 2 | Physical cell identity 2 | 500 | 7 | 2 (01) |
| Cell 3 | Physical cell identity 3 | 300 | 3 | 3 (10) |
| Cell 4 | Physical cell identity 4 | 100 |  | 4 (11) |

As shown in the foregoing Table 1, the configuration information of the n cells includes configuration information of a cell 1, a cell 2, a cell 3, and a cell 4. A cell identity included in the configuration information is a physical cell identity and a cell number. The configuration information of the cell 1, the cell 2, and the cell 3 includes: the physical cell identities, the frequency information of the cells, the bandwidth information of the cells, and the cell numbers. The configuration information of the cell 4 includes: the physical cell identity, the frequency information, and the cell number that are different from the content included in the configuration information of the cell 1, the cell 2, and the cell 3.

In the foregoing Table 1, the cell number is explicitly configured, the cell number of the cell 1 is 1, the cell number of the cell 2 is 2, the cell number of the cell 3 is 3, and the cell number of the cell 4 is 4. The network device indicates the cell number in a binary form. The foregoing Table 1 includes 4 cells, and two-bit information needs to be used for indication. As shown in the foregoing Table 1, 00 is used to indicate the cell number 1, 01 is used to indicate the cell number 2, and the like. In another possible embodiment, alternatively, the cell number may not be explicitly configured in the configuration information of the n cells, and Table 1 does not include the information of the cell number. In this case, it can still be obtained based on a sequence of each cell in the configuration information of the n cells that the cell number of the cell 1 is 1, the cell number of the cell 2 is 2, the cell number of the cell 3 is 3, and the cell number of the cell 4 is 4.

It should be noted that content and forms of the configuration information of the n cells shown in the foregoing Table 1 are all examples, and content included in the configuration information of different cells shown in the foregoing Table 1 is also an example. This is not limited in this embodiment.

Step 502: The network device sends, in the first cell, configuration information corresponding to the MBMS, where the configuration information corresponding to the MBMS includes: a cell identity of at least one second cell, and the second cell is used to transmit the MBMS in coordination with the first cell at a same scheduling moment or different scheduling moments.

Optionally, the network device sends the configuration information corresponding to the MBMS to the terminal device by using an MCCH. The MCCH may be the first MCCH in a modification period or the last MCCH in a modification period.

Optionally, the configuration information corresponding to the MBMS includes at least one of the cell identity of the at least one second cell, a TMGI of the MBMS, a first G-RNTI, and a DRX parameter. The TMGI and the DRX parameter are optional, and the first G-RNTI corresponds to the MBMS.

Optionally, the second cell is a subset of the n cells in the configuration information of the n cells that is sent by the network device to the terminal device.

Optionally, in the configuration information corresponding to the MBMS, the cell identity of the second cell is a cell number and a cell index of the second cell, the cell index is used to identify the second cell in DCI during cross-carrier scheduling, and the cell number corresponds to the cell index.

The cell number of the second cell is a sequence number of the second cell in the configuration information of the n cells, and the cell number includes a relatively large quantity of data information. The cell index of the second cell is a sequence number of the second cell in the configuration information corresponding to the MBMS. Compared with the cell number, the cell index identifies the second cell by using less data information.

For example, when a cell number in the configuration information of the n cells sent by the network device to the terminal device is explicitly configured, the network device sends signaling to indicate the cell number. When the configuration information of the n cells includes configuration information of eight cells, the network device needs to indicate a cell number in a binary form by using three-bit information. For example, 000 is used to indicate the cell number 1, 001 is used to indicate the cell number 2, . . . , and 111 is used to indicate a cell number 8. Assuming that the configuration information corresponding to the MBMS includes a cell identity of a second cell, and the second cell is a cell whose cell number is 3 in the n cells, the cell identity of the second cell in the configuration information corresponding to the MBMS includes the cell number 3 and a cell index 1. When indicating the cell number of the second cell, the network device still needs to use 010 to indicate the cell number 3, that is, needs to use three-bit information, and when indicating the cell index of the second cell, the network device needs to use only 0 to indicate the cell index 1, that is, needs to use only one-bit information.

It should be noted that the cell number of the second cell in the configuration information corresponding to the MBMS is the same as the cell number of the second cell in the configuration information of the n cells. The cell number of the second cell does not change, but corresponding cell indexes of the second cell may be different when different MBMSs are transmitted.

Optionally, the at least one second cell included in the configuration information corresponding to the MBMS is a secondary cell used to transmit the MBMS in coordination with the first cell at a same scheduling moment or different scheduling moments by using a carrier aggregation technology, and is a subset of the n cells included in the configuration information of the n cells.

As shown in the following Table 2, Table 2 shows an example of a possible form of the configuration information corresponding to the MBMS.

TABLE 2

|  | Cell number | DRX parameter | Cell index |
| --- | --- | --- | --- |
| Cell 2 | 2 (01) | Parameter 1 | 1 (0) |
| Cell 4 | 4 (11) | Parameter 2 | 2 (1) |

As shown in the foregoing Table 2, the configuration information corresponding to the MBMS includes two second cells: the cell 2 and the cell 4 in the foregoing Table 1. The configuration information corresponding to the MBMS includes cell numbers, DRX parameters, and cell indexes corresponding to the cell 2 and the cell 4. The cell number of the cell 2 is 2, and the cell number of the cell 4 is 4. The network device uses two-bit information for indication, which is the same as that of the cell numbers of the cell 2 and the cell 4 in the configuration information of the n cells shown in the foregoing Table 1. The cell index of the cell 2 is a sequence number of the cell 2 in the configuration information corresponding to the MBMS shown in Table 2, and the cell index of the cell 2 is 1. The cell index of the cell 4 is a sequence number of the cell 4 in the configuration information corresponding to the MBMS shown in Table 2, and the cell index of the cell 4 is 2. The network device indicates the cell index by using binary information. For example, the foregoing Table 2 includes the two second cells, and the network device uses one-bit information for indication. As shown in the foregoing Table 2, 0 is used to identify the cell index 1, and 1 is used to indicate the cell index 2.

It should be noted that content and forms shown in Table 2 are all examples, and this is not limited in this embodiment.

In this embodiment, for example, the second cell in the configuration information corresponding to the MBMS uses a licensed carrier.

It should be noted that the configuration information of the n cells may be configuration information shared by a plurality of MBMSs. When different MBMSs are transmitted, the second cells used to transmit the MBMS in coordination with the first cell at a same scheduling moment or different scheduling moments by using a carrier aggregation technology may be different. For example, the configuration information of the n cells that is sent by the network device to the terminal device is shown in the foregoing Table 1, when the network device transmits an MBMS to the terminal device, the cell 1 is used as the second cell, and when another MBMS is transmitted, the cell 2 is used as the second cell.

The terminal device receives, from the first cell, the configuration information of the n cells. A method for receiving, from the first cell, the configuration information corresponding to the MBMS is the same as that in step 501 and step 502. This is not described in detail again in this embodiment.

Step 503: A terminal device obtains configuration information of the second cell from the configuration information of the n cells based on the cell identity of the second cell.

The terminal device searches the configuration information of the n cells for the configuration information corresponding to the cell identity of the second cell that is included in the configuration information corresponding to the MBMS. Content included in the configuration information of the second cell is similar to content included in the configuration information of the n cells, and this is not described in detail again in this embodiment.

In an example, the cell identity of the second cell is a cell number. Cell numbers of second cells in the configuration information corresponding to the MBMS that is received by the terminal device are the cell number 2 and the cell number 4. The configuration information of the n cells that is received by the terminal device is shown in the foregoing Table 1. The terminal device obtains configuration information of the two second cells, that is, configuration information corresponding to the cell number 2 and the cell number 4, from the configuration information of the n cells based on the cell number 2 and the cell number 4.

Step 504: The terminal device receives, from the first cell, scheduling information by using a first G-RNTI, and receives, from the first cell, an MTCH based on the scheduling information.

The scheduling information is used to indicate a time-frequency resource location occupied by the MTCH.

It should be noted that the terminal device may alternatively receive, from the second cell, the scheduling information by using the first G-RNTI, and receive, from the first cell, the MTCH based on the scheduling information in a manner of cross-carrier scheduling.

Optionally, in a subframe that is N subframes after a subframe in which the configuration information corresponding to the MBMS is received, the terminal device receives, from the second cell, the MTCH based on the configuration information of the second cell, where N is a value greater than or equal to 0. The terminal device receives, from the second cell, the MTCH by using a method shown in the following step 505 or step 506.

Step 505: The terminal device receives, from the second cell, the scheduling information based on the configuration information of the second cell by using the first G-RNTI, and receives, from the second cell, the MTCH based on the scheduling information.

Step 506: The terminal device receives, from the first cell, the scheduling information based on the configuration information of the second cell by using the first G-RNTI, and receives, from the second cell, the MTCH based on the scheduling information.

It should be noted that step 504 and step 505 or step 504 and step 506 are not performed in a particular sequence, and are performed according to a specific scheduling policy.

Correspondingly, in a subframe that is N subframes after a subframe in which the configuration information corresponding to the MBMS is sent, the network device sends, in the second cell, the MTCH based on the configuration information of the second cell. The network device sends, in the second cell, the MTCH by using two different methods.

A method used by the network device to send, in the first cell, the MTCH based on the configuration information of the second cell by using the first G-RNTI is the same as that described in step 504.

A method used by the network device to send, in the second cell, the scheduling information by using the first G-RNTI, and send, in the second cell, the MTCH based on the scheduling information is similar to that in step 505. Alternatively, a method used by the network device to send, in the first cell, the scheduling information based on the configuration information of the second cell by using the first G-RNTI, and send, in the second cell, the MTCH based on the scheduling information is similar to that in step 506. This is not described in detail again in this embodiment.

In conclusion, in the multicast service sending and receiving method provided in this embodiment of the disclosure, the network device sends, in the first cell, the configuration information corresponding to the MBMS to a terminal device. The configuration information corresponding to the MBMS includes: a cell identity of at least one second cell. The terminal device obtains the configuration information of the second cell based on the cell identity of the second cell. The second cell is used to transmit the MBMS in coordination with the first cell at a same scheduling moment or different scheduling moments. The terminal device receives, from the second cell, the MTCH based on the configuration information of the second cell. This resolves a problem that the terminal device can receive, only in one cell, an MCCH and the MTCH corresponding to the MBMS, and achieves an effect that the terminal device can receive, from the first cell and the at least one second cell, a same multicast service by using a carrier aggregation technology.

In conclusion, in the multicast service sending and receiving method provided in this embodiment of the disclosure, the network device only needs to indicate the first G-RNTI to the terminal device. The terminal device may receive, from the first cell and the at least one second cell, the MTCH by using the first G-RNTI. The network device no longer needs to indicate, to the terminal device by using signaling, a G-RNTI used in each second cell, thereby reducing air interface signaling.

Figure 5B:
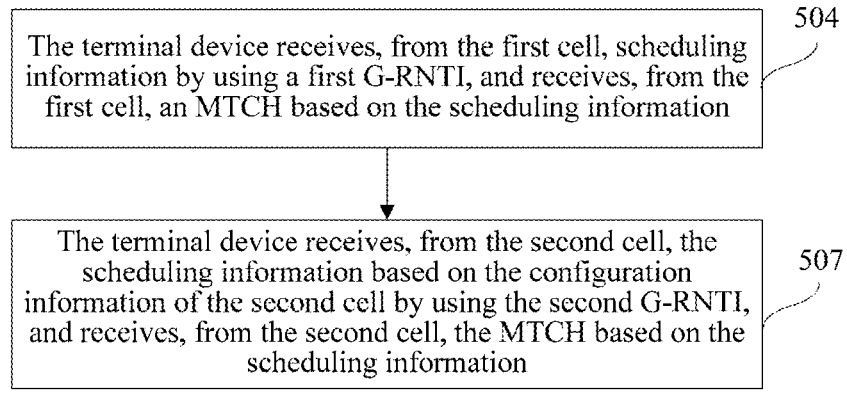
FIG. 5B is a flowchart of a multicast service sending and receiving method according to another example embodiment of the present disclosure.

Another optional embodiment is based on the embodiment shown in FIG. 5A. As shown in FIG. 5B, in this embodiment, an example in which the second cell uses an unlicensed carrier is used to describe a second manner in which the terminal device receives, from the second cell, an MCCH.

Based on the configuration information of the n cells and the configuration information corresponding to the MBMS described in step 501 and step 502, in this embodiment, in the configuration information of the n cells or the configuration information corresponding to the MBMS, the configuration information of the second cell further includes: a second G-RNTI.

Step 505 and step 506 may be alternatively replaced by and implemented as step 507.

Step 507: The terminal device receives, from the second cell, the scheduling information based on the configuration information of the second cell by using the second G-RNTI, and receives, from the second cell, the MTCH based on the scheduling information.

Optionally, in a subframe that is N subframes after a subframe in which the configuration information corresponding to the MBMS is received, the terminal device receives, from the second cell, the MTCH based on the configuration information of the second cell.

It should be noted that in this embodiment, the second cell may alternatively use a licensed carrier.

A method used by the network device to send, in the second cell, the scheduling information based on the configuration information of the second cell by using the second G-RNTI, and send, in the second cell, the MTCH based on the scheduling information is similar to that in step 507. This is not described in detail again in this embodiment.

In conclusion, in the multicast service sending and receiving method provided in this embodiment of the disclosure, the second cell used to transmit the MBMS jointly with the first cell by using a carrier aggregation technology may use an unlicensed carrier, so that the terminal device may receive, from the second cell using an unlicensed spectrum, a multicast service, thereby improving resource usage of the unlicensed spectrum.

Figure 6:
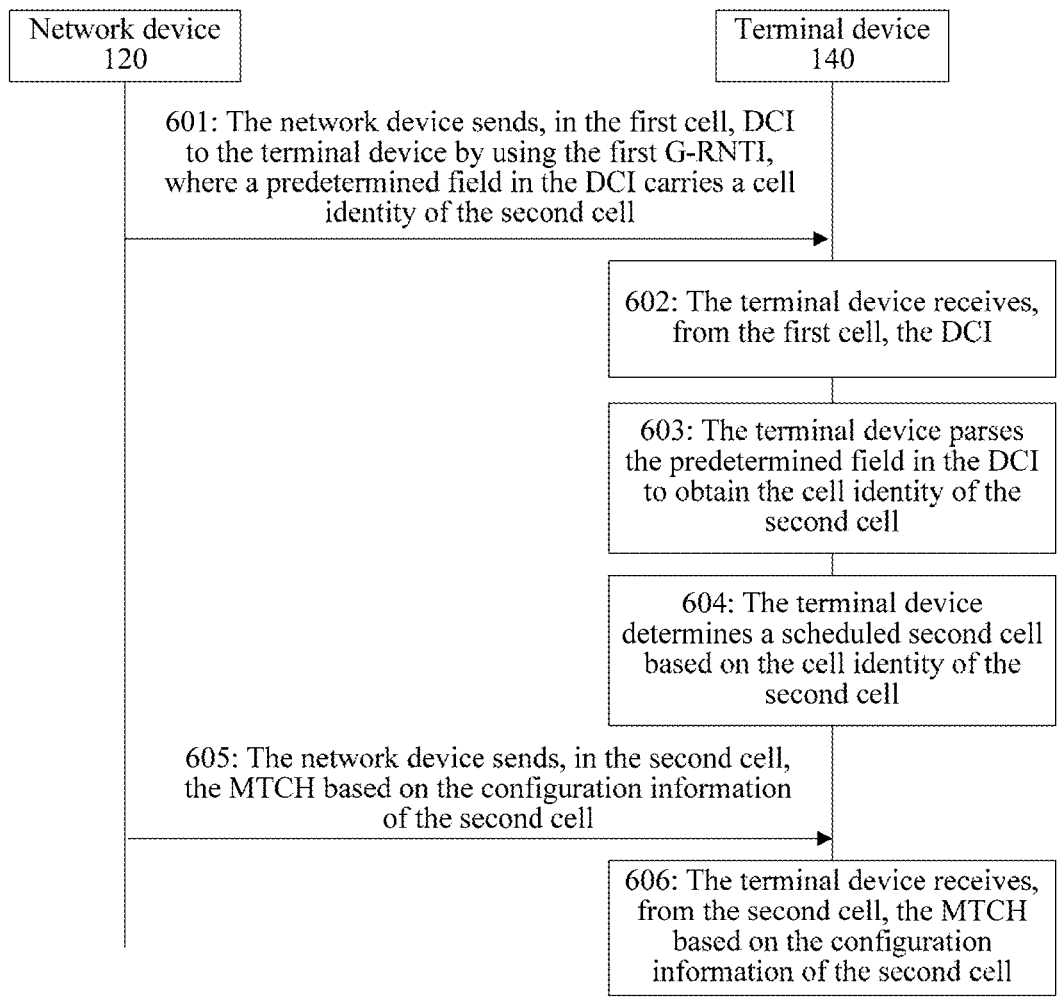
FIG. 6 is a flowchart of a multicast service sending and receiving method according to another example embodiment of the present disclosure.

Based on the embodiment shown in FIG. 5A, when the terminal device receives, from the second cell, the MTCH in the manner of cross-carrier scheduling described in step 506, the method includes the following several steps, as shown in FIG. 6.

Step 601: The network device sends, in the first cell, DCI to the terminal device by using the first G-RNTI, where a predetermined field in the DCI carries the cell identity of the scheduled second cell.

Optionally, the cell identity of the second cell carried in the predetermined field in the DCI is a cell index.

Optionally, the network device sends the DCI to the terminal device by using a physical downlink control channel (PDCCH).

In this embodiment, the DCI sent by the network device to the terminal device by using the first cell carries the cell identity of the second cell. Because a traditional DCI format 1A does not have a dedicated field used to transfer the cell identity of the second cell, in this embodiment, a predetermined field in the traditional DCI format 1A is redefined, and a useful field or a surplus field in the traditional DCI format 1A is used to transfer the cell identity of the second cell. The DCI in this embodiment may be referred to as a DCI format 1A or another DCI format such as a DCI format 1M. This is not limited in this embodiment.

Optionally, in a frequency division duplex (FDD) mode, the traditional DCI format 1A includes a surplus field having at least 9 bits; and in a time division duplex (TDD) mode, the traditional DCI format 1A includes a surplus field having at least 11 bits.

In this embodiment, after receiving the multicast service sent by the network device, the terminal device does not need to feed back HARQ information to the network device. Therefore, a HARQ process number, an NDI, an RV, and a TPC command for PUCCH related to a HARQ mechanism are all surplus fields. In addition, the multicast service is sent by the network device to the terminal device, that is, an operation is on a downlink, and a DCI format 0 is used to indicate uplink scheduling information. Therefore, a flag for format 0/format 1A differentiation is also a surplus field.

In this embodiment, the surplus field in the DCI format 1A is used as the predetermined field to transfer the cell identity of the second cell. That is, the predetermined field is at least one of the HARQ process number, the NDI, the RV, the TPC command for PUCCH, and the flag for format 0/format 1A differentiation.

In an example, the following Table 3 shows an example of a possible form of the traditional DCI format 1A, and shows different fields and field lengths corresponding to the different fields.

TABLE 3

| DCI format 1A |
| --- |
| Flag for format 0/format 1A differentiation-1 bit |
| LVRB/DVRB assignment flag-1 bit |
| RB assignment |
| MCS-5 bits |
| NDI-1 bit |
| RV-2 bits |
| — |
| TPC command for PUCCH-2 bits |
| HARQ process number-3 bits |

The LVRB/DVRB assignment flag refers to a resource assignment flag of a Localized virtual resource block (LVRB)/a distributed virtual resource block (DVRB). The RB assignment refers to a resource assignment manner of a resource block (RB). A field length corresponding to the RB assignment is not fixed. This is not limited in this embodiment.

It should be noted that content and forms shown in Table 3 are all examples, and this is not limited in this embodiment. In an example, the predetermined field in the DCI is the HARQ process number, that is, the HARQ process number in the traditional DCI format 1A is redefined in the DCI. In this case, the network device transfers the cell identity by using the three bits corresponding to the HARQ process number.

Step 602: The terminal device receives, from the first cell, the DCI by using the first G-RNTI.

Step 603: The terminal device parses the predetermined field in the DCI to obtain the cell identity of the second cell.

Optionally, the terminal device performs parsing to obtain the scheduling information based on another field in the DCI, for example, determines, based on the RB assignment, a resource block on which data receiving is performed from the second cell. Content in the another field is not limited in this embodiment.

The terminal device parses the predetermined field in the DCI to obtain the cell index, and determines, based on the cell index, that the second cell corresponding to the cell index is the scheduled second cell.

Step 604: The terminal device determines the configuration information of the scheduled second cell based on the cell identity of the second cell.

Optionally, the second cell corresponding to the cell index in the DCI received by the terminal device is the scheduled second cell, and is at least one second cell in the configuration information corresponding to the MBMS.

Optionally, the terminal device determines the cell number of the scheduled second cell based on the cell index of the second cell that is obtained by parsing and the configuration information corresponding to the MBMS, and determines the configuration information of the scheduled second cell based on the cell number of the scheduled second cell and the configuration information of the n cells.

In an example, the configuration information of the n cells that is received by the terminal device is shown in the foregoing Table 1, and the configuration information corresponding to the MBMS is shown in the foregoing Table 2. The terminal device parses the predetermined field in the received DCI to obtain that the cell index is 1. The terminal device determines, based on the cell index and the configuration information corresponding to the MBMS, that a cell number corresponding to the cell index 1 is 2, and determines, based on the cell number and the configuration information of the n cells, that a second cell whose cell number is 2 is the cell 2. Therefore, the scheduled second cell is the cell 2. The terminal device determines configuration information of the cell 2.

Step 605: The network device sends, in the second cell, the MTCH based on the configuration information of the second cell.

Step 606: The terminal device receives, from the second cell, the MTCH based on the configuration information of the second cell.

The terminal device receives, from the second cell, the MTCH based on the determined configuration information of the scheduled second cell. In the foregoing example, the terminal device receives, from the cell 2, the MTCH.

Figure 7:
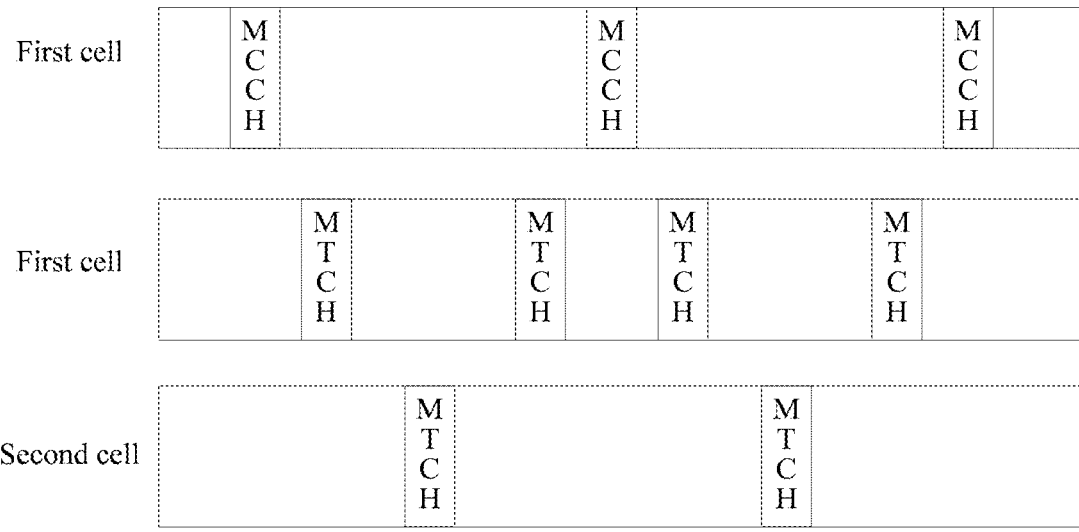
FIG. 7 is a schematic diagram of sending and receiving a multicast service according to an example embodiment of the present disclosure.

In an example, the network device transmits the multicast service to the terminal device in the system shown in FIG. 1A. The terminal device 140 receives the transmitted MBMS on two component carriers. A primary carrier corresponds to the first cell 10, a secondary carrier corresponds to the second cell 11, the first cell uses a licensed carrier, and the second cell uses an unlicensed carrier. A schematic diagram of transmitting, by the network device 120, a service to the terminal device 140 is shown in FIG. 7.

The terminal device receives, from the first cell, the MCCH. The MCCH carries the configuration information of the n cells and the configuration information corresponding to the MBMS. The terminal device receives, from the first cell, the MTCH and/or receives, from the second cell, the MTCH based on the MCCH.

Figure 8:
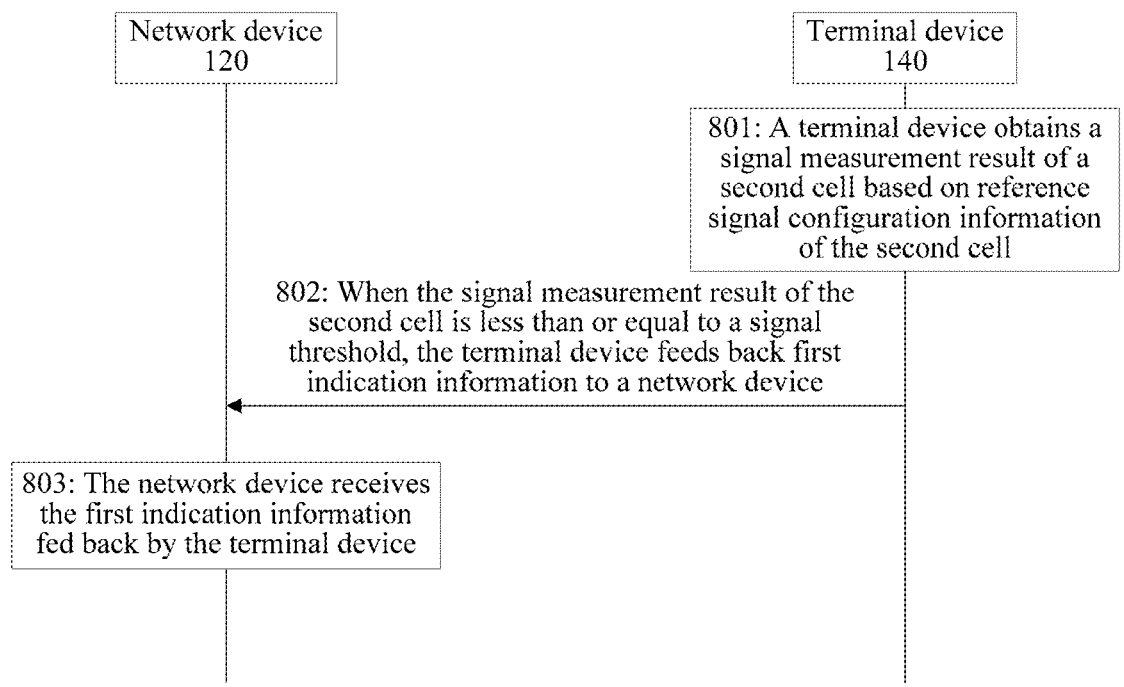
FIG. 8 is a flowchart of a multicast service sending and receiving method according to another example embodiment of the present disclosure.

In another optional embodiment based on the foregoing embodiment, before the terminal device receives, from the first cell and/or the second cell, the MTCH, the method further includes the following steps shown in FIG. 8.

In this embodiment, the configuration information of the second cell further includes: a signal threshold and reference signal configuration information of the second cell.

Step 801: The terminal device obtains a signal measurement result of the second cell based on the reference signal configuration information of the second cell.

Optionally, the reference signal configuration information is discovery reference signal (DRS) and/or common reference signal (CRS) configuration information.

Step 802: When the signal measurement result of the second cell is less than or equal to the signal threshold, the terminal device feeds back first indication information to the network device.

The first indication information is used to indicate to the network device that the signal measurement result of the second cell is less than or equal to the signal threshold, and indicates that signal quality of the terminal device in the second cell is already very poor.

It should be noted that a value of the signal threshold is not limited in this embodiment.

Step 803: The network device receives the first indication information fed back by the terminal device.

Optionally, after the network device receives the first indication information fed back by the terminal device, the terminal device is scheduled to receive the MBMS again in two manners: determining a new second cell; or stopping transmitting the MBMS by using the carrier aggregation technology. This is not limited in this embodiment. Content included in the first indication information is not limited either in this embodiment.

Optionally, the network device sends the configuration information corresponding to the MBMS to the terminal device again. The configuration information corresponding to the MBMS that is sent again includes: a cell identity of the new second cell.

In an example, the configuration information of the n cells is shown in the foregoing Table 1, and the second cell used to transmit the MBMS jointly with the first cell by using the carrier aggregation technology is the cell 2. When obtaining by measurement that a signal measurement result of the cell 2 is less than the signal threshold, the terminal device feeds back the first indication information to the network device. After receiving the first indication information, the network device determines that the new second cell is the cell 3, and sends the configuration information corresponding to the MBMS that includes a cell identity of the cell 3 to the terminal device again, so that the MBMS is transmitted in both the cell 3 and the cell 1. Alternatively, the network device sends, to the terminal device, signaling used to instruct to stop transmitting the MBMS by using the carrier aggregation technology, so that the MBMS is transmitted only in the first cell.

In conclusion, in the multicast service sending and receiving method provided in this embodiment of the disclosure, the terminal device measures a signal of the second cell to obtain the signal measurement result, and when the signal measurement result is less than or equal to the signal threshold, feeds back the first indication information to the network device. This achieves an effect that when the signal of the second cell used to transmit the MTCH is poor, a feedback may be provided to the network device in time to avoid a transmission error caused because the signal of the second cell is excessively poor.

Figure 9:
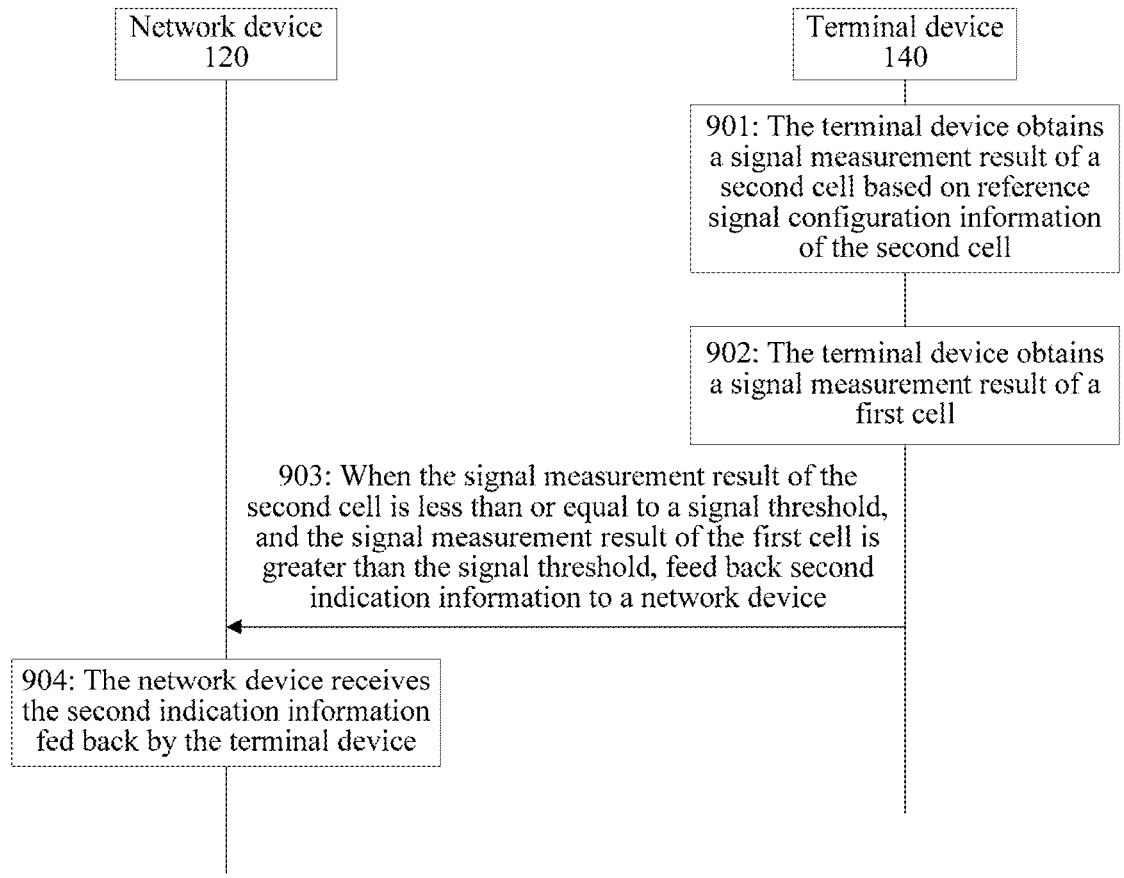
FIG. 9 is a flowchart of a multicast service sending and receiving method according to another example embodiment of the present disclosure.

In another optional embodiment based on the foregoing embodiment, before the terminal device receives, from the first cell and/or the second cell, the MTCH, the method further includes the following steps shown in FIG. 9.

In this embodiment, the configuration information of the second cell further includes: a signal threshold and reference signal configuration information of the second cell.

Step 901: The terminal device obtains a signal measurement result of the second cell based on the reference signal configuration information of the second cell.

Optionally, the reference signal configuration information is DRS and/or CRS configuration information.

Step 902: The terminal device obtains a signal measurement result of the first cell.

Step 903: When the signal measurement result of the second cell is less than or equal to the signal threshold, and the signal measurement result of the first cell is greater than the signal threshold, feed back second indication information to the network device.

The second indication information is used to indicate to the network device that the signal measurement result of the first cell is greater than the signal threshold, and the signal measurement result of the second cell is less than or equal to the signal threshold.

It should be noted that a value of the signal threshold is not limited and content included in the second indication information is not limited either in this embodiment.

Optionally, when the signal measurement result of the first cell is less than or equal to the signal threshold, the second indication information is not fed back to the network device.

Step 904: The network device receives the second indication information fed back by the terminal device.

Optionally, after the network device receives the second indication information fed back by the terminal device, the terminal device is scheduled to receive the MBMS again in two manners: determining a new second cell used to transmit the MBMS jointly with the first cell; or stopping transmitting the MBMS by using the carrier aggregation technology. This is not limited in this embodiment.

Optionally, the network device sends the configuration information corresponding to the MBMS to the terminal device again. The configuration information corresponding to the MBMS that is sent again includes: a cell identity of the new second cell used to transmit the MBMS jointly with the first cell.

In conclusion, in the multicast service sending and receiving method provided in this embodiment of the disclosure, the terminal device measures signals of the first cell and the second cell to obtain the signal measurement results. When the signal of the first cell is also relatively poor, although a feedback is provided to the network device, the multicast service still cannot be transmitted by using a cell with a better signal. Therefore, when the signal of the second cell is relatively poor, the signal of the first cell is detected. Only when the signal of the first cell is relatively desirable and the signal of the second cell is relatively poor, a feedback is provided to the network device. This avoids waste of air interface signaling caused by meaningless information feedback.

Apparatus embodiments of the present disclosure are described below, and may be used to perform the method embodiments of the present disclosure. For details not disclosed in the apparatus embodiments of the present disclosure, refer to the method embodiments of the present disclosure.

Figure 10:
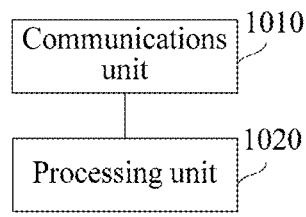
FIG. 10 is a block diagram of a multicast service sending and receiving apparatus according to an example embodiment of the present disclosure.

Referring to FIG. 10, FIG. 10 is a structural block diagram of a multicast service receiving apparatus according to an embodiment of the present disclosure. The multicast service receiving apparatus may be implemented as a part or a whole of a terminal device by using software, hardware, or a combination thereof. The multicast service receiving apparatus may include: a communications unit 1010 and a processing unit 1020.

The communications unit 1010 is configured to receive, from a first cell, configuration information corresponding to an MBMS, where the configuration information corresponding to the MBMS includes: a cell identity of at least one second cell, and the second cell is used to transmit the MBMS in coordination with the first cell at a same scheduling moment or different scheduling moments.

The processing unit 1020 is configured to obtain configuration information of the second cell based on the cell identity of the second cell.

The communications unit 1010 is further configured to receive, from the second cell, an MTCH based on the configuration information of the second cell.

For how the processing unit 1020 obtains the configuration information of the second cell and how the communications unit 1010 receives the MTCH, refer to the foregoing method embodiments.

It should be noted that the terminal device may receive and/or send information by using the communications unit 1010, and the terminal device may obtain information and process information by using the processing unit 1020.

Figure 11:
FIG. 11 is a block diagram of a multicast service sending and receiving apparatus according to an example embodiment of the present disclosure.

Referring to FIG. 11, FIG. 11 is a structural block diagram of a multicast service sending apparatus according to an embodiment of the present disclosure. The multicast service sending apparatus may be implemented as a part or a whole of a network device (for example, a base station) by using software, hardware, or a combination thereof. The multicast service sending apparatus may include: a communications unit 1110.

The communications unit 1110 is configured to send, in a first cell, configuration information corresponding to an MBMS, where the configuration information corresponding to the MBMS includes: a cell identity of at least one second cell, and the second cell is used to transmit the MBMS in coordination with the first cell at a same scheduling moment or different scheduling moments.

The communications unit 1110 is further configured to send, in the second cell, an MTCH based on configuration information of the second cell.

For how the communications unit 1110 sends the configuration information corresponding to the MBMS and the MTCH, refer to the foregoing method embodiments.

It should be noted that the network device may send and/or receive information by using the communications unit 1110.

In an optional embodiment, the configuration information corresponding to the MBMS further includes: a first G-RNTI.

The communications unit 1010 is further configured to: receive, from the first cell, the scheduling information by using the first G-RNTI, and receive, from the first cell, the MTCH based on the scheduling information.

The communications unit 1010 is further configured to: receive, from the second cell, the scheduling information based on the configuration information of the second cell by using the first G-RNTI, and receive, from the second cell, the MTCH based on the scheduling information.

Alternatively, the communications unit 1010 is further configured to: receive, from the first cell, the scheduling information based on the configuration information of the second cell by using the first G-RNTI, and receive, from the second cell, the MTCH based on the scheduling information.

The communications unit 1110 is further configured to: send, in the first cell, the scheduling information by using the first G-RNTI, and send, in the first cell, the MTCH based on the scheduling information.

The communications unit 1110 is further configured to: send, in the second cell, the scheduling information based on the configuration information of the second cell by using the first G-RNTI, and send, in the second cell, the MTCH based on the scheduling information.

Alternatively, the communications unit 1110 is further configured to: send, in the first cell, the scheduling information based on the configuration information of the second cell by using the first G-RNTI, and send, in the second cell, the MTCH based on the scheduling information.

In another optional embodiment, the configuration information corresponding to the MBMS further includes: a first G-RNTI, and the configuration information corresponding to the MBMS or the configuration information of the second cell further includes: a second G-RNTI.

The communications unit 1010 is further configured to: receive, from the first cell, the scheduling information by using the first G-RNTI, and receive, from the first cell, the MTCH based on the scheduling information.

The communications unit 1010 is further configured to: receive, from the second cell, the scheduling information based on the configuration information of the second cell by using the second G-RNTI, and receive, from the second cell, the MTCH based on the scheduling information.

The communications unit 1110 is further configured to: send, in the first cell, the scheduling information by using the first G-RNTI, and send, in the first cell, the MTCH based on the scheduling information.

The communications unit 1110 is further configured to: send, in the second cell, the scheduling information based on the configuration information of the second cell by using the second G-RNTI, and send, in the second cell, the MTCH based on the scheduling information.

In another optional embodiment, the communications unit 1010 is further configured to: in a subframe that is N subframes after a subframe in which the configuration information corresponding to the MBMS is received, receive, from the second cell, the MTCH based on the configuration information of the second cell.

The communications unit 1110 is further configured to: in a subframe that is N subframes after a subframe in which the configuration information corresponding to the MBMS is sent, send, in the second cell, the MTCH based on the configuration information of the second cell.

In another optional embodiment, the communications unit 1010 is further configured to receive, from the first cell, DCI by using the first G-RNTI.

The processing unit 1020 is further configured to parse a predetermined field in the DCI to obtain the cell identity of the second cell.

The processing unit 1020 is further configured to determine configuration information of the scheduled second cell based on the cell identity of the second cell.

The communications unit 1010 is further configured to receive, from the second cell, the MTCH based on the configuration information of the second cell.

The communications unit 1110 is further configured to send, in the first cell, the DCI to the terminal device by using the first G-RNTI, where the predetermined field in the DCI carries the cell identity of the scheduled second cell.

In another optional embodiment, the configuration information of the second cell further includes: a signal threshold and reference signal configuration information of the second cell, and the reference signal configuration information is DRS and/or CRS configuration information.

The processing unit 1020 is further configured to obtain a signal measurement result of the second cell based on the reference signal configuration information of the second cell.

The communications unit 1010 is further configured to: when the signal measurement result of the second cell is less than or equal to the signal threshold, feed back first indication information to the network device.

The communications unit 1110 is further configured to receive the first indication information fed back by the terminal device.

In another optional embodiment, the configuration information of the second cell further includes: a signal threshold and reference signal configuration information of the second cell, and the reference signal configuration information is DRS and/or CRS configuration information.

The processing unit 1020 is further configured to obtain a signal measurement result of the second cell based on the reference signal configuration information of the second cell.

The processing unit 1020 is further configured to obtain a signal measurement result of the first cell.

The communications unit 1010 is further configured to: when the signal measurement result of the second cell is less than or equal to the signal threshold, and the signal measurement result of the first cell is greater than the signal threshold, feed back second indication information to the network device.

The communications unit 1110 is further configured to receive the second indication information fed back by the terminal device.

It should be noted that the sending and receiving functions of the communications unit 1010 may be implemented by using a transceiver of the terminal device. The function of the determining unit 1020 may be implemented by using a processor of the terminal device. The function of the communications unit 1110 may be implemented by using a transceiver of the network device. To implement the foregoing technical solutions, the terminal device and the network device may further include other electronic devices, for example, a memory configured to store code for implementing the foregoing functions, a power supply, an antenna, and the like.

It should be understood that, unless the context clearly supports an exception, a single form "one" ("a", "an", "the") used herein also intends to include a plural form. It should be further understood that "and/or" used herein intends to include any and all possible combinations of one or more correlated items that are listed.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer readable storage medium. The storage medium may include: a read-only memory, a magnetic disk, or a compact disc.

The foregoing descriptions are merely examples of embodiments of the present disclosure, but are not intended to limit the present disclosure. Any modification, equivalent replacement, and improvement made without departing from the principle of the present disclosure shall fall within the protection scope of the present disclosure.

What is claimed is:
1. A multicast service receiving method, comprising:
receiving, by a terminal device from a first cell, configuration information corresponding to a multimedia broadcast multicast service (MBMS), wherein the configuration information comprises a cell identity of a second cell, and wherein the second cell is configured to transmit the MBMS in coordination with the first cell at a same scheduling moment or different scheduling moments;
obtaining, by the terminal device, configuration information of the second cell based on the cell identity of the second cell; and
receiving, by the terminal device from the second cell, an MBMS traffic channel (MTCH) based on the configuration information of the second cell.

2. The method according to claim 1, wherein:
before obtaining, by the terminal device, configuration information of the second cell based on the cell identity of the second cell, the method comprises:
receiving, by the terminal device from the first cell, configuration information of n cells, wherein the n cells are cells supporting coordinated transmission of the MBMS, and wherein the second cell is a subset of the n cells, and the configuration information comprises at least a correspondence among a cell identity, frequency information, and bandwidth information; and
obtaining, by the terminal device, configuration information of the second cell based on the cell identity of the second cell comprises:
obtaining, by the terminal device, the configuration information of the second cell from the configuration information of the n cells based on the cell identity of the second cell.

3. The method according to claim 1, wherein:
the configuration information corresponding to the MBMS further comprises: a first group-radio network temporary identifier (G-RNTI);
the method further comprises:
receiving, by the terminal device from the first cell, scheduling information by using the first G-RNTI, and receiving, from the first cell, the MTCH based on the scheduling information; and
receiving, by the terminal device from the second cell, an MBMS traffic channel MTCH based on the configuration information of the second cell comprises:
receiving, by the terminal device from the second cell, the scheduling information based on the configuration information of the second cell by using the first G-RNTI, and receiving, from the second cell, the MTCH based on the scheduling information, or
receiving, by the terminal device from the first cell, the scheduling information based on the configuration information of the second cell by using the first G-RNTI, and receiving, from the second cell, the MTCH based on the scheduling information, wherein the scheduling information is used to indicate a time-frequency resource location occupied by the MTCH.

4. The method according to claim 1, wherein:
the configuration information corresponding to the MBMS further comprises: a first group-radio network temporary identifier (G-RNTI), and the configuration information corresponding to the MBMS or the configuration information of the second cell further comprises: a second G-RNTI;
the method further comprises:
receiving, by the terminal device from the first cell, scheduling information by using the first G-RNTI, and receiving, from the first cell, the MTCH based on the scheduling information; and
receiving, by the terminal device from the second cell, an MBMS traffic channel MTCH based on the configuration information of the second cell comprises:
receiving, by the terminal device from the second cell, the scheduling information based on the configuration information of the second cell by using the second G-RNTI, and receiving, from the second cell, the MTCH based on the scheduling information, wherein the scheduling information is used to indicate a time-frequency resource location occupied by the MTCH.

5. The method according to claim 4, wherein:
the first cell uses a licensed carrier, and the second cell uses a licensed carrier or an unlicensed carrier.

6. The method according to claim 3, wherein receiving, by the terminal device from the first cell, the scheduling information based on the configuration information of the second cell by using the first G-RNTI, and receiving, from the second cell, the MTCH based on the scheduling information comprises:
receiving, by the terminal device from the first cell, downlink control information (DCI) by using the first G-RNTI;
parsing, by the terminal device, a preset field in the DCI to obtain the cell identity of the second cell;
determining, by the terminal device, the configuration information of the scheduled second cell based on the cell identity of the second cell; and
receiving, by the terminal device from the second cell, the MTCH based on the configuration information of the second cell.

7. The method according to claim 1, wherein:
the configuration information of the second cell comprises: the cell identity of the second cell;
in the configuration information of the n cells, the cell identity of the second cell is a physical cell identity of the second cell or a physical cell identity of the second cell and a cell number of the second cell;
in the configuration information corresponding to the MBMS, the cell identity of the second cell is the cell number of the second cell and a cell index of the second cell, wherein the cell number of the second cell is a sequence number of the second cell in the configuration information of the n cells, and the cell index of the second cell is a sequence number of the second cell in the configuration information corresponding to the MBMS.

8. A multicast service receiving apparatus, comprising:
a transceiver configured to:
receive, from a first cell, configuration information corresponding to a multimedia broadcast service (MBMS), wherein the configuration information corresponding to the MBMS comprises: a cell identity of a second cell, and wherein the second cell is configured to transmit the MBMS in coordination with the first cell at a same scheduling moment or different scheduling moments;
a processor coupled to the transceiver and configured to:
obtain configuration information of the second cell based on the cell identity of the second cell; and
wherein the transceiver is further configured to receive, from the second cell, an MBMS traffic channel (MTCH) based on the configuration information of the second cell.

9. The apparatus according to claim 8, wherein:
the transceiver is further configured to receive, from the first cell, configuration information of n cells, wherein the n cells are cells supporting coordinated transmission of the MBMS, the second cell is a subset of the n cells, and the configuration information comprises at least a correspondence among a cell identity, frequency information, and bandwidth information; and
the processor is configured to obtain the configuration information of the second cell from the configuration information of the n cells based on the cell identity of the second cell.

10. The apparatus according to claim 8, wherein:
the configuration information corresponding to the MBMS further comprises: a first group-radio network temporary identifier (G-RNTI); and
the transceiver is further configured to:
  receive, from the first cell, scheduling information by using the first G-RNTI, and receive, from the first cell, the MTCH based on the scheduling information;
  receive, from the second cell, the scheduling information based on the configuration information of the second cell by using the first G-RNTI, and receive, from the second cell, the MTCH based on the scheduling information, or
  receive, from the first cell, the scheduling information based on the configuration information of the second cell by using the first G-RNTI, and receive, from the second cell, the MTCH based on the scheduling information, wherein the scheduling information is used to indicate a time-frequency resource location occupied by the MTCH.

11. The apparatus according to claim 8, wherein:
the configuration information corresponding to the MBMS further comprises: a first group-radio network temporary identifier (G-RNTI);
the configuration information corresponding to the MBMS or the configuration information of the second cell further comprises: a second G-RNTI;
the transceiver is further configured to:
  receive, from the first cell, scheduling information by using the first G-RNTI, and receive, from the first cell, the MTCH based on the scheduling information, or
  receive, from the second cell, scheduling information based on the configuration information of the second cell by using the second G-RNTI, and receive, from the second cell, the MTCH based on the scheduling information, wherein the scheduling information is used to indicate a time-frequency resource location occupied by the MTCH.

12. The apparatus according to claim 11, wherein:
the first cell uses a licensed carrier, and the second cell uses a licensed carrier or an unlicensed carrier.

13. The apparatus according to claim 10, wherein:
the transceiver is further configured to receive, from the first cell, downlink control information (DCI) by using the first G-RNTI;
the processor is further configured to:
  parse a predetermined field in the DCI to obtain the cell identity of the second cell, and
  determine the configuration information of the scheduled second cell based on the cell identity of the second cell; and
the transceiver is further configured to receive, from the second cell, the MTCH based on the configuration information of the second cell.

14. The apparatus according to claim 8, wherein:
the configuration information of the second cell comprises: the cell identity of the second cell;
in the configuration information of the n cells, the cell identity of the second cell is a physical cell identity of the second cell or a physical cell identity of the second cell and a cell number of the second cell;
in the configuration information corresponding to the MBMS, the cell identity of the second cell is the cell number of the second cell and a cell index of the second cell; and
wherein the cell number of the second cell is a sequence number of the second cell in the configuration information of the n cells, and the cell index of the second cell is a sequence number of the second cell in the configuration information corresponding to the MBMS.

15. The apparatus according to claim 8, wherein:
the configuration information of the second cell further comprises: a signal threshold and reference signal configuration information of the second cell, wherein the reference signal configuration information is discovery reference signal (DRS) and/or common reference signal (CRS) configuration information; and
the processor is further configured to:
  obtain a signal measurement result of the second cell based on the reference signal configuration information of the second cell; and
the transceiver is further configured to:
  when the signal measurement result of the second cell is less than or equal to the signal threshold, feed back first indication information to a network device to indicate to the network device that the signal measurement result of the second cell is less than or equal to the signal threshold.

16. A non-transitory readable medium comprising:
a memory; and
program instructions stored in the memory which, when executed by a processor, cause a device to:
  receive from a first cell, configuration information corresponding to a multimedia broadcast multicast service (MBMS), wherein the configuration information corresponding to the MBMS comprises: a cell identity of a second cell, and the second cell is configured to transmit the MBMS in coordination with the first cell at a same scheduling moment or different scheduling moments,
  obtain configuration information of the second cell based on the cell identity of the second cell, and
  receive from the second cell, an MBMS traffic channel (MTCH) based on the configuration information of the second cell.

17. The medium according to claim 16, wherein program instructions stored in the memory, when executed by the processor, further cause the device to:
  receive, by the terminal device from the first cell, configuration information of n cells, wherein the n cells are cells supporting coordinated transmission of the MBMS, the second cell is a subset of the n cells, and the configuration information comprises at least a correspondence among a cell identity, frequency information, and bandwidth information; and
  obtain, by the terminal device, the configuration information of the second cell from the configuration information of the n cells based on the cell identity of the second cell.

18. The medium according to claim 16, wherein:
the configuration information corresponding to the MBMS further comprises: a first group-radio network temporary identifier (G-RNTI); and
the program instructions stored in the memory, when executed by the processor, further cause the device to:
  receive, by the terminal device from the first cell, scheduling information by using the first G-RNTI, and receive, from the first cell, the MTCH based on the scheduling information, and
  receive, by the terminal device from the second cell, the scheduling information based on the configuration information of the second cell by using the first G-RNTI, and receive, from the second cell, the MTCH based on the scheduling information, or receive, by the terminal device from the first cell, the scheduling information based on the configuration information of the second cell by using the first G-RNTI, and receive, from the second cell, the MTCH based on the scheduling information, wherein the scheduling information is used to indicate a time-frequency resource location occupied by the MTCH.

19. The medium according to claim 16, wherein:

the configuration information corresponding to the MBMS further comprises: a first group-radio network temporary identifier (G-RNTI);

the configuration information corresponding to the MBMS or the configuration information of the second cell further comprises: a second G-RNTI;

the program instructions stored in the memory which, when executed by the processor, further cause the device to:

receive, by the terminal device from the first cell, scheduling information by using the first G-RNTI, and receive, from the first cell, the MTCH based on the scheduling information, and receive, by the terminal device from the second cell, the scheduling information based on the configuration information of the second cell by using the second G-RNTI, and receive, from the second cell, the MTCH based on the scheduling information, wherein the scheduling information is used to indicate a time-frequency resource location occupied by the MTCH.

20. The medium according to claim 19, wherein:

the first cell uses a licensed carrier, and the second cell uses a licensed carrier or an unlicensed carrier.

* * * * *